United States Patent [19]

Hanson et al.

[11] 3,956,766
[45] May 11, 1976

[54] COUNTER RESETTING CIRCUITRY FOR MAGNETIC DISK SYSTEM

[75] Inventors: Charles Christian Hanson; Francis Kong King, both of Rochester, Minn.

[73] Assignee: International Business Machines Corporation, Armonk, N.Y.

[22] Filed: Nov. 25, 1974

[21] Appl. No.: 526,666

[52] U.S. Cl. ............................................ 360/78
[51] Int. Cl.[2] .................................... G11B 21/08
[58] Field of Search ..................................... 360/78

[56] References Cited
UNITED STATES PATENTS

| | | | |
|---|---|---|---|
| 3,800,317 | 3/1974 | Lin........................................ | 360/78 |
| 3,881,184 | 4/1975 | Koepcke et al...................... | 360/78 |

Primary Examiner—Robert S. Tupper
Attorney, Agent, or Firm—Keith T. Bleuer

[57] ABSTRACT

A magnetic disk, particularly of the thin flexible type, has a magnetic head traversing the disk in order to come into registry with various concentric tracks on the disk. An electric motor of the stepping type is mechanically connected with the head for so moving the head, and a "present track number" counter is so electrically connected with the stepping motor as to keep track of the particular magnetic track on which the head is located. On a certain contingency, such as a cessation of power to the system, the circuitry includes components so connected as to cause the stepping motor to move the magnetic head to an outer limit on the disk, outwardly of a prerecorded reference track on the disk. When this point is reached, a switch is actuated by the movement of the head, and connected circuitry causes the head to move back onto the reference track. When a maximum amplitude is detected by the head due to passage over the reference track, the circuitry includes components that reset the content of the "present track number" counter to zero; and all of the inner tracks within the reference track are counted from the zero count in the "present track number" counter, so as to thereby compensate for any changes in dimension of the magnetic disk.

5 Claims, 7 Drawing Figures

COUNTER RESETTING CIRCUITRY FOR MAGNETIC DISK SYSTEM

BACKGROUND OF THE INVENTION

This invention relates to apparatus for recording and reading data on a magnetic media and more particularly on a magnetic disk. More particularly, the invention relates to apparatus for initializing counting mechanism which keeps track of the particular magnetic track on which a magnetic head is located when the head moves across a prerecorded reference track on the disk.

Heretofore, it has been the practice to count the particular tracks on a magnetic disk over which a magnetic head positions using a counter which counts for each track traversed by the magnetic head. When such a system is used in connection with rigid disks, relatively no difficulty has been had in locating the inner tracks; however, when a thin flexible disk is used in lieu of the relatively rigid magnetic disk, the changes in dimension of the thin disk with time, temperature and wear have caused a lack of correspondence between the content of the counter and the position of the magnetic head.

SUMMARY OF THE INVENTION

It is accordingly an object of the present invention to provide a system for use in connection with a magnetic recording device, particularly a magnetic disk with a magnetic head traverseable across the disk, whereby compensation is made for changes in dimension of the disk as well as for long term temperature changes and wearing of the mechanical drive for the magnetic head.

More particularly, it is an object of the invention to provide, in connection with a track number counter the content in which varies with the position of a magnetic head on a magnetic disk, means for initializing the content of the counter to take cognizance of changes in dimension, particularly, of the disk.

Still more particularly, it is an object of the invention to provide means for automatically moving the magnetic head across the magnetic disk to an outermost position and then moving the head back across a reference track adjacent the outer edge of the disk, means for detecting the passage of the magnetic head across the reference track, and means for resetting a counter for keeping track of the position of the magnetic head as the magnetic head passes across the center of the reference track, so that the initial content of the counter is changed if necessary to correspond with the position of the reference track on the disk.

BRIEF DESCRIPTION OF THE DRAWINGS

FIG. 1 is a diagram showing the manner in which

DESCRIPTION OF THE PREFERRED EMBODIMENT

Figure 1:
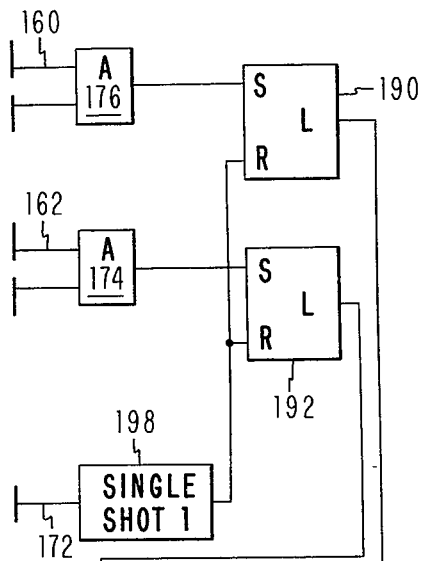
Figure 1B:
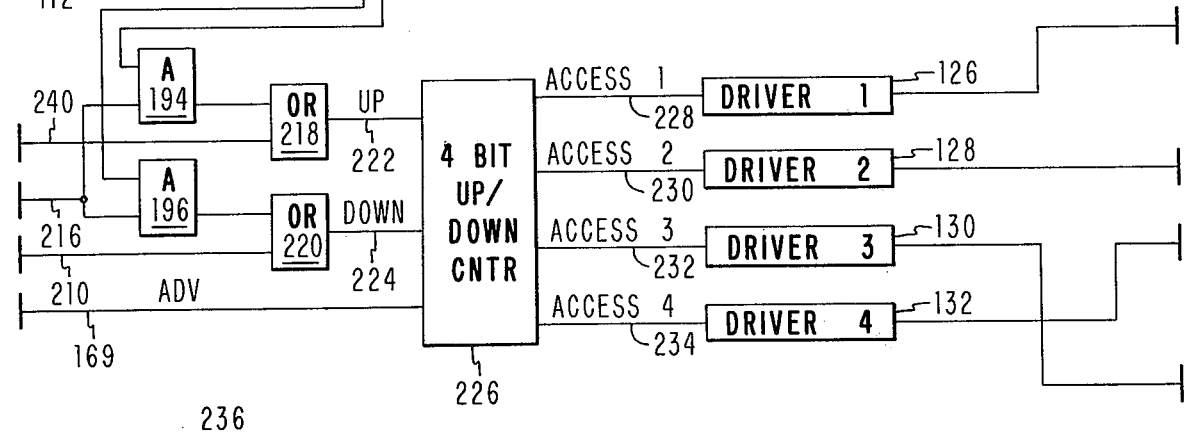
FIGS. 1a, 1b and 1c are placed together in order to form a complete control circuit for initially moving a magnetic head to an outermost position on a magnetic disk, then returning the head to a reference track adjacent the outer edge of the disk and at that time initializing the count in a "present track number" counter to correspond with the position of the head as it crosses the reference track, all in accordance with the teachings of the invention.
Figure 1B:
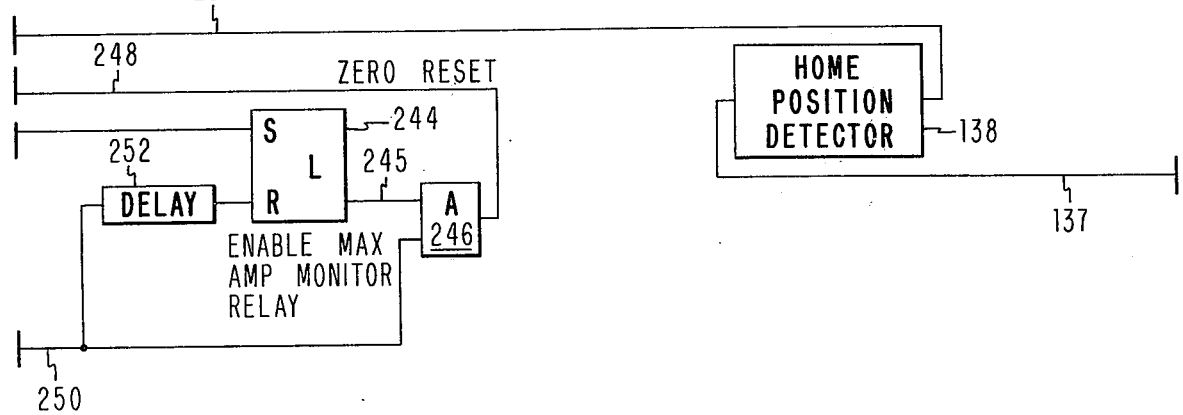
Figure 1A:
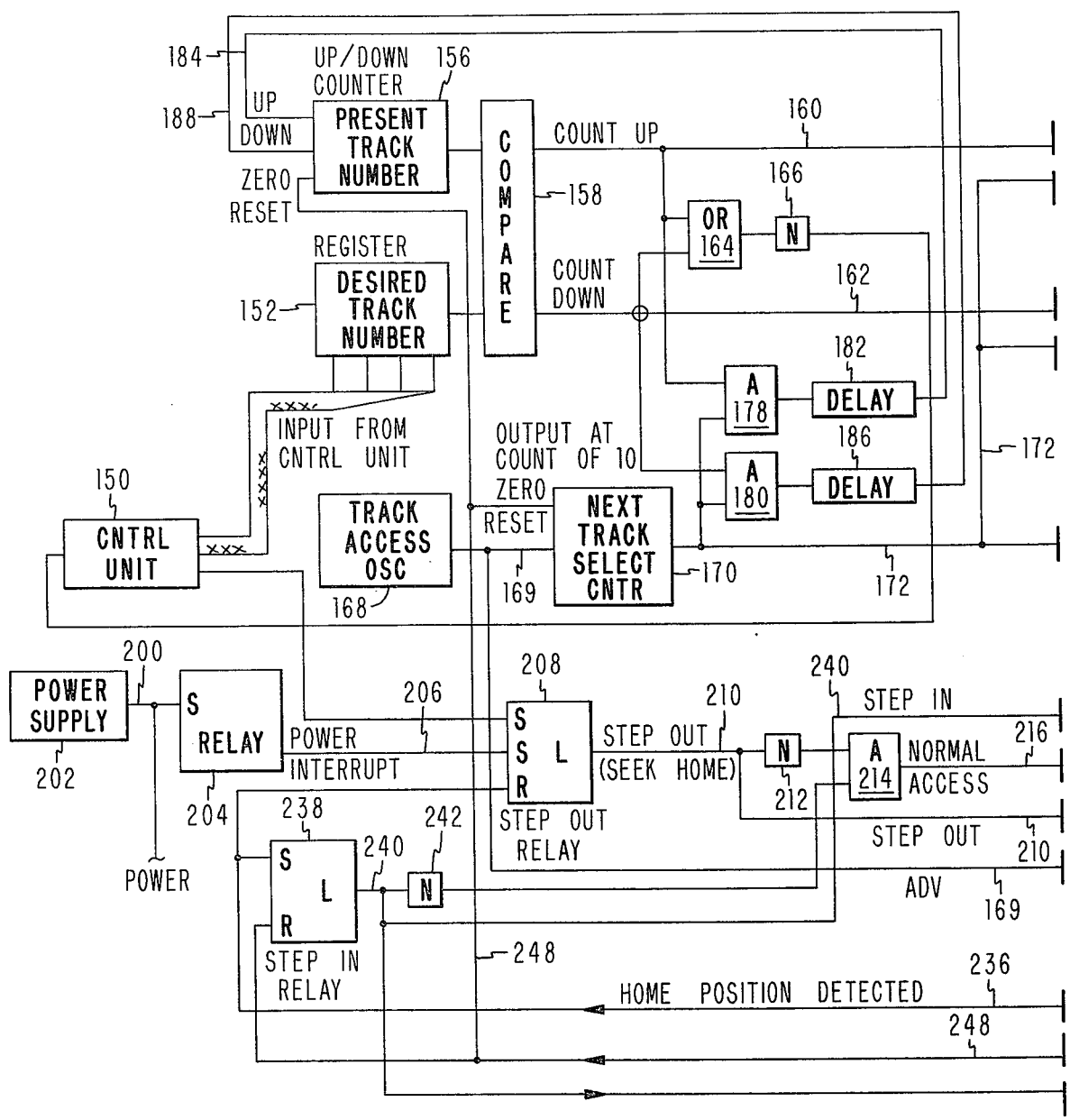
Figure 1A:
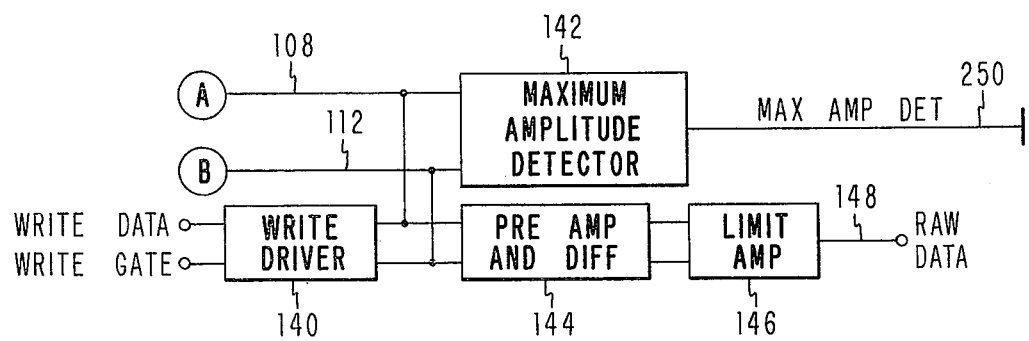
Figure 2:
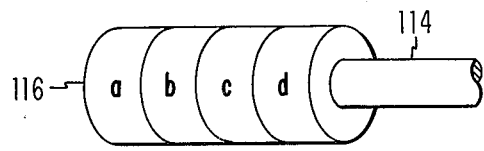
FIG. 2 is a perspective view of a stepping motor which is a part of the FIG. 1a–1c circuitry.
Figure 1C:
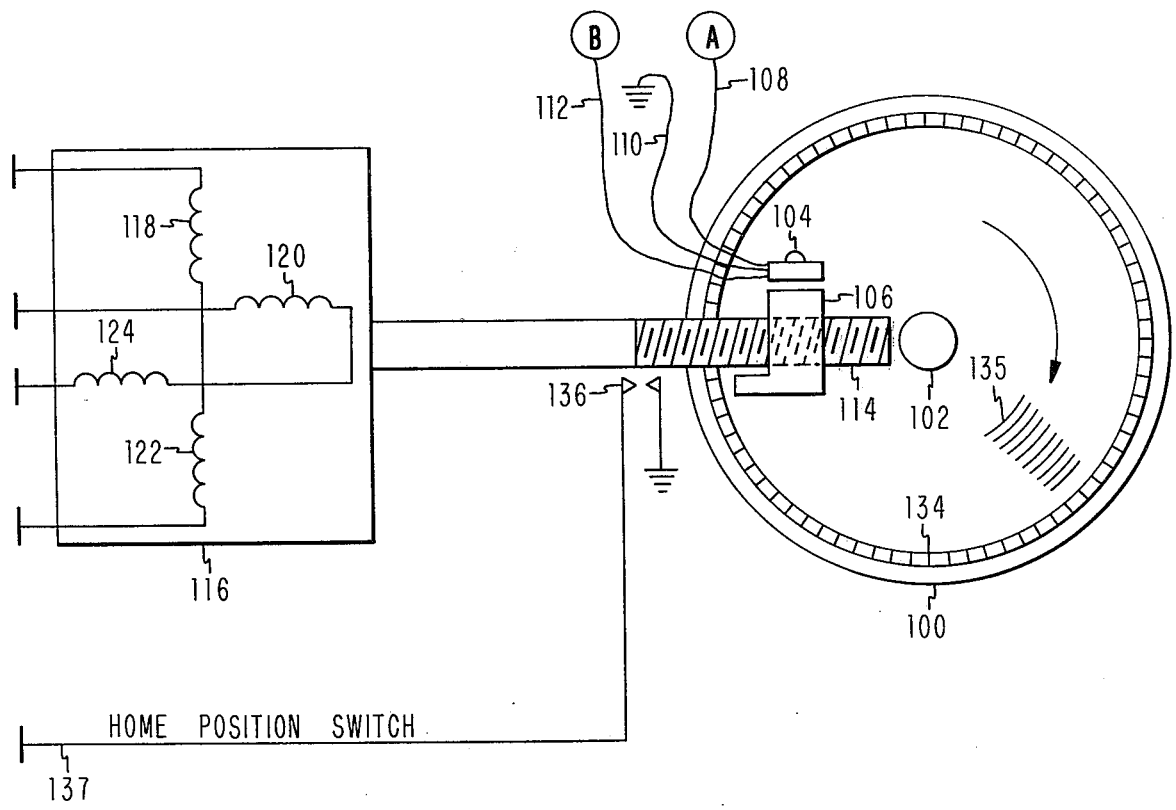

The control system of the invention functions with respect to a magnetic disk 100 which is fixed on and rotatable with a spindle or shaft 102 (see FIGS. 1a–1c). The disk 100 may be thin and flexible and, for example, may be of polyethylene terephthalate of 0.003 inch thickness with an unoriented $Fe_2O_3$ coating on both sides. A magnetic head 104 is carried by a carriage 106 in such manner that the carriage and head traverse across the surface of the disk 100 so that reading or writing may be accomplished by the head. The head 104 has input and output lines 108, 110 and 112. The carriage 106 is mounted on a lead screw 114 constituting the output shaft of an electric motor 116 of the stepping type. The motor 116 may have four different windings 118, 120, 122 and 124 respectively disposed in sections a, b, c and d of the motor (see FIG. 2). Drivers 126, 128, 130 and 132 are respectively connected to the windings 118, 120, 122 and 124. The stepping motor 116 and the drivers 126, 128, 130 and 132 are of conventional construction and may be of the general type, for example, disclosed in U.S. Pat. No. 3,842,331.

A reference track 134 is preliminarily written on the disk 100. The reference track 134 is located adjacent to the outer edge of the disk 100 and outside of the series of data tracks 135 which may be written on the disk 100 preliminarily by means of the head 104 under control of the control unit 150. A home position sense switch 136 is so located to be closed by the carriage 106 when the head 104 moves farther outwardly with respect to the spindle 102 than the reference track 134. The home position sense switch 136 is connected by means of a line 137 carrying a HOME POSITION SWITCH signal to a home position detector circuit 138. A write driver 140 has its outputs connected to lines 108 and 112 and thereby to head 104, and the lines 108 and 112 are also connected to a maximum amplitude detector 142 and to a preamp and differentiator 144. A limit amplifier 146 is connected to the preamp and differentiator 144 and has an output line 148 on which data read by the head 104 from the disk 100 may be sensed. This reading and writing circuitry is conventional.

The FIGS. 1a–1c control system is under the control of a control unit 150 which in particular controls a "desired track number" register 152. An up/down "present track number" counter 156 has its output connected to a compare circuit 158, and the output of the desired track number register 152 is also connected to the compare circuit 158. Depending on the relationship between the contents of the counter 156 and the contents of the register 152, the compare circuit 158 provides a COUNT UP signal on an output line 160 or a COUNT DOWN signal on an output line 162. An OR circuit 164 has its two inputs connected to the lines 160 and 162 and has its output connected through an inverter 166 with the control unit 150.

A "track access" oscillator 168 is connected by line 169 to a "next track select" counter 170 that provides an output on an output line 172 for each count of 10 in the counter 170. The line 172 is connected to AND circuits 174 and 176, and the AND circuits 174 and 176 also have inputs connected to the "count up" line 160 and "count down" line 162. The line 172 is also connected to AND circuits 178 and 180, and these AND circuits have other inputs connected to the "count up" line 160 and the "count down" line 162. A delay circuit 182 is connected to the output of the AND circuit 178 and has an output "down" lead 184 connected to the up/down counter 156. A delay circuit 186 is connected to the output of the AND circuit 180 and has an output "up" lead 188 also connected to the counter 156.

The "set" terminals of latches 190 and 192 are respectively connected to the outputs of AND circuits 176 and 174, and the outputs of the latches 190 and 192 are respectively connected to AND circuits 194 and 196. The "reset" terminals of the latches 190 and 192 are connected to the output of a single shot 198 which has the lead 172 as its input.

The circuitry is under the control of the supply voltage on a lead 200 from a power supply 202. The supply voltage on line 200 is used to supply the various components of the circuitry, such as the stepping motor 116, with power. A relay 204 has its "set" terminal connected with the line 200 and supplies a POWER INTERRUPT signal on an output lead 206 when the relay 204 is in reset condition which automatically occurs in relay 204 with a cessation of power on the line 200.

A "step out" latch relay 208 has a "set" terminal thereof connected with the line 206, and the relay 208 has another "set" terminal thereof connected with an output of the control unit 150. The latch relay 208, when set, provides a STEP OUT or a SEEK HOME signal on an output lead 210; and lead 210 is connected through an inverter 212 with an AND circuit 214. The AND circuit 214, when satisfied, provides a NORMAL ACCESS signal on an output line 216 which is connected to the AND circuits 194 and 196 as inputs. The outputs of the AND circuits 194 and 196 are connected with OR circuits 218 and 220. The line 210 also constitutes an input to the OR circuit 220. The OR circuits 218 and 220 respectively provide UP and DOWN signals on output lines 222 and 224 which are applied as inputs to a four bit up/down counter 226. The counter 226 also has an ADVANCE signal applied to it from line 169 constituting the output of the track access oscillator 168. The counter 226 has the lines 228, 230, 232 and 234 as output lines respectively carrying ACCESS 1, ACCESS 2, ACCESS 3 and ACCESS 4 signals. The lines 228, 230, 232 and 234 respectively constitute inputs to the drivers 126, 128, 130 and 132.

The home position detector 138 has an output line 236 carrying the signal HOME POSITION DETECTED, and line 236 is connected to the "set" terminal of a "step in" latch relay 238 as well as to the "reset" terminal of the latch relay 208. The latch relay 238 has an output line 240 carrying a STEP IN signal which is applied as an input to the OR circuit 218. The line 240 is also connected to an inverter 242 which is in turn connected with the AND circuit 214 to supply an input thereto. The line 240 is also connected with the "set" input of a latch relay 244 which may be termed an "enable max amplitude monitor" relay, and the output of the relay 244 is connected by means of a line 245 carrying a MONITOR MAXIMUM AMPLITUDE DETECTOR SIGNAL to an AND circuit 246. The AND circuit 246 provides a ZERO RESET signal on an output line 248 which is applied to the "reset" terminal of relay 238 and is also applied to the counters 156 and 170 for resetting both of these counters.

The maximum amplitude detector 142 supplies a MAXIMUM AMPLITUDE DETECTED output signal on a line 250, and this line is applied to the AND circuit 246 as an input and is also applied to the "reset" terminal of the relay 244 through a delay circuit 252.

Except under the conditions in which the power supply 202 fails or the control unit 150 signals that it has detected a solid error in the information read from disk 100, the circuitry of FIGS. 1a–1c may be considered to operate "normally" under which conditions the head 106 moves in and out with respect to the shaft 102 to read from or write on different concentric tracks on the disk 100. The carriage 106 is driven either inwardly or outwardly on the disk 100 by means of the stepping motor 116 acting through lead screw 114. This "normal" operation is very similar to the normal operation of the carriage-moving circuitry set forth in my copending application Ser. No. 336,391, filed Feb. 27, 1973 (now U.S. Pat. No. 3,860,958). During this "normal" operation, the NORMAL ACCESS signal is up on line 216, and each of AND circuits 194 and 196 is enabled when there is a corresponding output from either the latch 190 or the latch 192.

In order to move the carriage 106 in one direction or the other, stepping motor 116 can be driven in either direction to rotate lead screw 114 in the corresponding direction. When operating in either direction, motor 116 rotates a multiple number of steps in order to move magnetic head 104 one track position. In this particular example, ten steps are required to move carriage 106 and in turn magnetic head 104 one track position.

Figure 3:
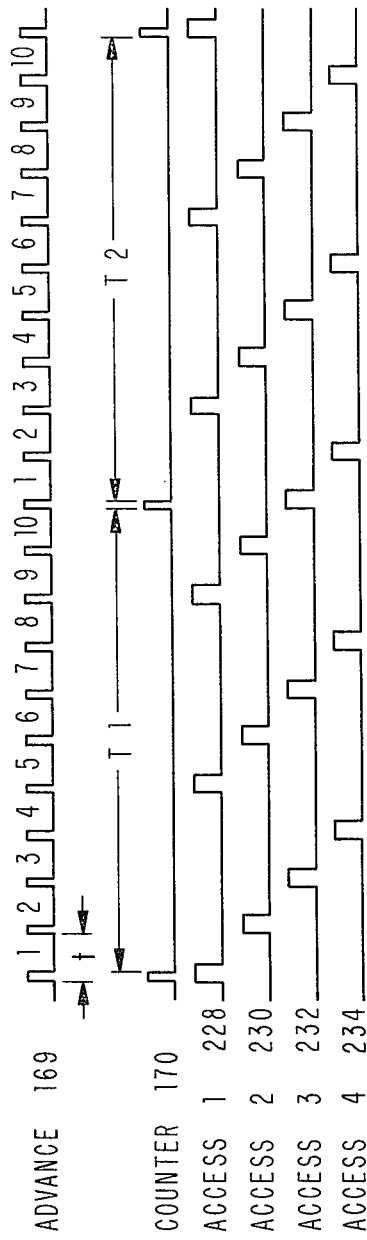
FIGS. 3 and 4 are diagrams showing certain signals in the circuitry of FIGS. 1a–1c.

The operation of the stepping motor 116 is under the control of the counter 226. Counter 226 is a four bit up and down counter and counts under the control of the ADVANCE signal on line 169 which, as shown in FIG. 3, constitutes a succession of pulses from oscillator 168. Counter 226 counts up under control of the UP signal on line 222 derived from OR circuit 210 and counts down under the control of the DOWN signal on line 224 constituting the output of the OR circuit 220. The counter 226 produces the ACCESS 1, ACCESS 2, ACCESS 3 and ACCESS 4 signal on lines 228, 230, 232 and 234 which are also shown in FIG. 3; and it will be observed from FIG. 3 that each of these access signals occurs for every four output pulses of the oscillator 168. The ACCESS 1, ACCESS 2, ACCESS 3 and ACCESS 4 signals are staggered timewise so that these signals occur for every output pulse from the oscillator 168, as shown in FIG. 3. The ACCESS 1, ACCESS 2, ACCESS 3 and ACCESS 4 signals are applied onto the drivers 126, 128, 130 and 132 so that the ACCESS 1 signal causes energization of the winding 118; the ACCESS 2 signal causes energization of the winding 120; the ACCESS 3 signal causes energization of the winding 124; and the ACCESS 4 signal causes energization of the winding 122. Each of these winding energizations cause the armature of the stepping motor 116 and the lead screw 114 connected therewith to move one step; and the sequence in which the windings 118, 120, 122 and 124 are energized determines the direction of rotation of the armature motor and lead screw 114. The number of steps made by motor 116 is determined by the number of times drivers 126, 128, 130 and 132 are energized so as to energize the corresponding windings 118, 120, 122 and 124. This, of course, is determined by the number of times that counter 226 is advanced. Referring to FIG. 3, the time $t$ is the time for one step of the stepping motor 116; the time T1 is the time required for an even track access; and the time T2 is the time required for a following odd track access. For a more detailed understanding of the manner in which the drivers 126, 128, 130 and 132 cause the motor 116 to rotate in the two directions, the aforementioned U.S. Pat. No. 3,842,331 may be referred to.

The UP and DOWN control signals on lines 222 and 224 essentially come from compare circuit 158 which compares the output of up/down counter 156 containing the present track number on which the magnetic head 104 is disposed with the output of desired track number register 152. The desired track number is fed into register 152 from the control unit 150 which puts into register 152 the number of the track to which it is desired that the magnetic head 104 shall move. Compare circuit 158 provides the COUNT UP output connected to AND circuit 178 and the COUNT DOWN output connected to AND circuit 180 when the content in counter 156 is respectively less and greater than the content in register 152. The output of the next track select counter 170 is also connected to the AND circuits 178 and 180, and the counter 170 is so constructed that it provides an output pulse on line 172 for each 10 pulses input on line 169 from the track access oscillator 168. The outputs of AND circuits 178 and 180 are connected through the delay circuits 182 and 186 to the UP and DOWN input terminals of the present track number counter 156 by means of the lines 184 and 188. The present track number counter 156 due to the COUNT UP signal and COUNT DOWN signal and the signal output of the next track select counter 170 applied to it through the AND circuits 178 and 180 contains the number of the track on which the magnetic head 104 is presently situated.

The output signal from the counter 170 is also applied to the AND circuits 174 and 176 which are appropriately conditioned by the COUNT UP and COUNT DOWN signals from compare circuit 158. Hence, if compare circuit 158 provides a COUNT UP signal; AND circuit 176 upon receiving this signal will pass a signal for setting latch 190. On the other hand, if compare circuit 158 provides a COUNT DOWN signal; AND circuit 174 in response to this signal will pass a signal for setting latch 192. The set outputs of latches 190 and 192 are connected to control the counter 226 via the AND circuits 194 and 196, which have at this time the continuous NORMAL ACCESS signal applied to them, and also via the OR circuits 218 and 220. OR circuit 218 provides the UP signal on line 222, and OR circuit 220 provides the DOWN signal on line 224, both signals being applied to the counter 226 so as to control the counter 226 in its count up and count down modes respectively.

Latches 190 and 192 are reset by a signal from the single shot 198 which has a shorter period than delay circuits 182 and 186. The single shot 198 is fired by the output signal of counter 170. By this arrangement, counter 226 is advanced 10 times in either the count up or count down mode depending upon whether latch 190 or 192 is set. This causes the magnetic head 104 to be moved one track by motor 116. If magnetic head 104 is not as yet at the desired track position, compare 158 will still have a count up or count down output; and counter 226 will be advanced ten more times before counter 170 generates an output signal. This causes counter 156 to be updated, and the operation repeats until magnetic head 104 is at the desired track position. When the value in counter 156 equals the value in register 152, magnetic head 104 is at the desired track position; and compare 158 does not have a COUNT UP output signal or a COUNT DOWN output signal. The absence of these two signals results in neither an UP signal nor a DOWN signal on lines 222 and 224, so that the motor 116 and head 104 stop. OR circuit 164 also detects the absence of the COUNT UP and COUNT DOWN signals on lines 160 and 162, and inverter 166 signals the control unit 150 that the magnetic head 104 is at the desired track position, so that the control unit 150 can start the appropriate reading or writing action.

In the event that the power supply 202 fails or in the event that a solid error is detected by the control unit 150, the NORMAL ACCESS signal on line 216 goes down; and AND circuits 194 and 196 are thereby disabled so that UP and DOWN signals cannot be applied to the counter 226 to cause the carriage 106 and its head 104 to move in either direction. Under these conditions, the circuitry of the invention causes the head 104 to be stepped outwardly beyond the outer reference track 134 and then stepped back again, as will now be described in greater detail.

As has been previously briefly mentioned, on disk files that require interchange of media (the substitution of one disk 100 for another disk 100, for example), differences in the head positioning systems and media centering mechanisms limit the minimum allowable track spacing. This is particularly true for flexible disks 100 which may change dimensions in one direction across the disk in contrast with a direction at 90° thereto. Therefore, the total amount of data that can be written on a disk will be limited by the accuracy of the access mechanism.

On disk systems using electric motors of the stepping type which make more than one step per track, it is possible to make corrections which will compensate for off track variations, and the present system does make such corrections. The present system in particular accomplishes this result by initializing the access mechanism on the outer reference track 134 each time the power is turned off or when a solid error is detected. Thus the interchange tolerances, as well as long term temperature and wear tolerances, within a given drive can be compensated.

To initialize the position of the head 104, the head is stepped outwardly over and beyond the outer track 134. The head is then stepped back onto the recorded data on track 134 until a maximum signal is detected by the head 104. This then represents a reference point from which all tracks inside the outermost track 134 is measured, and the accuracy of correction is limited by the resolution of the access mechanism. Therefore, the number of steps per track the greater the precision of the corrections.

The reference track 134 is written on the outer edge of disk 100 at the time of manufacture by a standard disk writer. The pitch of the lead screw 114 is such that a plurality of $m$ steps of the stepping motor 116 are required to move the head 104 one track increment. When it is desired to initialize the position of the head 104, the control unit shown in FIG. 1 causes the track select unit to count down the head position until the zero position sense switch 136 is actuated. This actuation takes place when the head 104 is located outwardly a distance sufficient to guarantee that the head 104 will not read a signal from the reference track 134. At this time, the circuitry steps the head 104 back onto the disk surface one step at a time ($1/m$ of a track).

After each step, the maximum amplitude detector 142 is monitored. When a signal is detected from detector 142 which is less than the level at the end of the previous step substantially at the center of track 134, the position counters 152 and 156 will be reset and all future track accesses will be referenced to the position of the reference track 134. The accuracy of positioning on the reference track 134 can be very close to plus or minus one-half of one step of the stepping motor 116.

When the power supply 202 fails, the signal on the line 200 fails; and the relay 204 resets itself to provide the POWER INTERRUPT signal on line 206. The POWER INTERRUPT signal on line 205 sets the step out latch relay 208. The relay 208 is likewise set when the control unit 150 detects a solid error in the data on the disk 200, using conventional means for this purpose. The relay 208 when thus set, provides the STEP OUT or SEEK HOME signal on line 210, and this signal provides the DOWN signal on line 224 by means of OR circuit 220. The DOWN signal applied to counter 226 causes the stepping motor 116 to so rotate the lead screw 114 that the carriage 106 and head 104 are stepped toward the outer edge of the disk 100. Under these conditions, the inverter 212 causes the AND circuit 214 to be disabled; and, therefore, under these conditions, the NORMAL ACCESS signal on line 216 does not exist. Due to the absence of the NORMAL ACCESS signal on line 216, the AND circuits 194 and 196 cannot be satisfied to cause the stepping motor 116 to be active in its usual manner for stepping the carriage 106 and head 104 to the desired track number in accordance with the content in the desired track number register 152, as previously described.

The outward movement of the carriage 106 and head 104 continues (under the action of the output of the track access oscillator 168 and the four bit up/down counter 226) until the carriage 106 closes the home position switch 136 to cause the home position detector 138 to provide its output HOME POSITION DETECTED signal on line 236. The magnetic head 104 has moved at this time outwardly beyond the reference track 134. The HOME POSITION DETECTED signal on line 236 is applied to the reset terminal of the latch relay 208 and resets the relay 208 so as to discontinue the STEP OUT or SEEK HOME signal on line 210. The HOME POSITION DETECTED signal on line 236 also sets step in latch relay 238, and the setting of the latch relay 238 in effect reverses the action on the up/down counter 226. At this time, the inverter 242 having the resulting signal from the latch relay 238 applied to it still inhibits the action of the AND circuit 214 so that the NORMAL ACCESS signal on line 216 cannot exist. The signal on the line 240 from the latch relay 238 is the STEP IN signal, and this is applied to OR circuit 218 to result in the UP signal on line 222 applied to the four bit up/down counter 226. This results in the drivers 126, 128, 130 and 132 so energizing the motor 116 to move the carriage 106 and head 104 inwardly of the disk 100 toward the shaft 102. This inward motion of the carriage 106 and head 104 continues until the maximum amplitude detector 142 causes this motion to cease.

The maximum amplitude detector has the output on lines 108 and 112 from the head 104 applied to it and provides an output signal on line 250 an instant after the maximum amplitude from the reference track 134 is detected and just as the output from the head 104 due to the reference track 134 starts to decrease. The head 104 is then substantially in the middle of the reference track 134. This constitutes the zero position of the carriage 106 and head 104 on the disk 100.

The STEP IN signal on line 240 has also been applied to the set terminal of the latch relay 244, setting the relay 244. The relay 244 thus applies an output signal to the AND circuit 246 via line 245, and thus both the signal on line 250 as well as that from the latch relay 244 are applied to AND circuit 246. When the signal on line 250 occurs, this signal thus passes through AND circuit 246 and is applied onto line 248. The signal on line 248 constitutes a reset signal for resetting latch 238 and also for resetting counters 170 and 156 so that there is a zero content of both the counters 156 and 170. This resetting of the latch 238 causes a cessation of the STEP IN signal on line 240 and a stoppage of motor 116 and head 104. The latch relay 244 is immediately reset by the signal on the line 250 applied through the delay circuit 252 so that the latch relay 244 is only operational during this zeroing cycle when the maximum amplitude from magnetic head 104 as it passes over reference track 134 is detected. Thus, on subsequent movements of the magnetic head 104 inwardly of the disk 100, the maximum amplitude detector 142 will not be effective for inner tracks on the disk 100. The sequence has now been completed; and the latches 208, 238 and 244 are all inoperative until the next error or the next cessation of power supply occurs. The control unit 150 at this time puts the desired track number count into the register 152, and the carriage 106 and head 104 move inwardly to the desired track number, as has been previously described. Since, under these conditions, both of the latches 208 and 238 are reset, the inverters 212 and 242 acting in conjunction with the AND circuit 214 provide the NORMAL ACCESS signal on line 216 so that the stepper motor 116 is effective to move the carriage 106 and head 104 inwardly until the content of the present track number counter 156 matches the content of the desired track number register 152.

Figure 4:
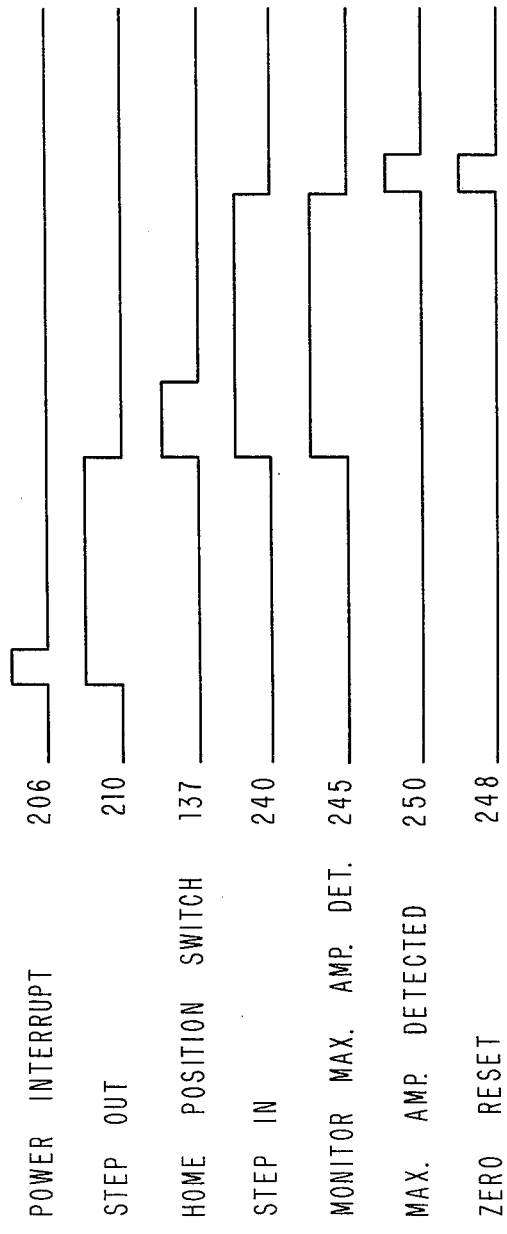

FIG. 4 is a diagram showing various important signals in the FIGS. 1a-1c circuitry. As will be observed from FIG. 4, the POWER INTERRUPT signal may only constitute a pulse, sufficient for setting the step out relay latch 208 which remains set until it is reset by a signal applied on its reset terminal. The other parts of the circuitry which causes the carriage 106 to move outwardly to the limit of its movement and then to return over the reference track remain operative regardless of the length of the pulse on line 206, these being principally the relays 238 and 244. The STEP OUT signal on line 210 raises at the same time as the POWER INTERRUPT signal on line 206 raises. The HOME POSITION SWITCH signal on line 137 raises at the same time as the STEP OUT signal on line 210 goes low. The STEP IN signal on line 240 and the MONITOR MAXIMUM AMPLITUDE DETECTOR signal on line 245 raise at the same time as the HOME POSITION SWITCH signal on line 137 raises. The MAXIMUM AMPLITUDE DETECTED signal on line 250 and the ZERO RESET signal on line 248 raise at the same time as the STEP IN signal on line 240 and MONITOR MAXIMUM AMPLITUDE DETECTOR signal on line 245 go low. The signals on lines 248 and 250 are only pulses, as will be noted.

As has been mentioned, the zero reset signal on line 248 resets the counter 156 to zero, and this occurs as the magnetic head 104 passes across the substantial center of the reference track 134. Thus, all of the inner tracks 135 on the disk 100, within the reference track 134, are measured from the center of the reference track 134. Therefore, if there has been any change in dimensions of the disk 100, the locations of the inner tracks 135 on the disk 100 have been changed to correspond with the present position of the outermost reference track 134. This occurs whenever the power is turned off, and it may thus be expected that this recalibration of the inner tracks occurs quite frequently so that long term temperature and wear tolerances for the drive of the carriage 106 by means of the lead screw 114 are compensated.

It will be obvious that changes may be made in the invention as above disclosed while still within the purview of the invention. For example, the reference track 134 could be located adjacent to the spindle 102 and within all of the data tracks 135 on the disk 100 instead of being located adjacent the outer periphery of the disk 100. With this change, the reference track located adjacent to the spindle 102 would be the track from which the present track number counter 156 would count. The circuitry of FIGS. 1a–1c could obviously be changed to accommodate this change in reference track position; however, from a simplicity standpoint, it would only be necessary to (1) change the direction of threading of the lead screw 114 to the opposite hand and (2) to reposition the switch 136 so that it is actuated by the carriage 106 as the head 104 moves inwardly of the reference track located adjacent the spindle 102. With these two structural changes, no changes in circuitry would be necessary to utilize a reference track located adjacent the spindle 102 instead of one located adjacent the periphery of the disk 100.

The initialization has been described as being responsive to a power-down situation or the location of a solid error by the control unit 150; however, it will be apparent that other conditions as well may be used in order to cause the initialization to occur. For example, if the disk 100 is located within an enclosure with a lid, the relay 102 could be connected with a switch actuated by the lid so that the relay 204 is de-energized every time the lid is opened. In this case, each opening of the lid would cause the initialization operation to occur as has been described. It will be obvious also that, although the track locating circuitry initialized by the reference track 134 has been described in connection with the circular disk 100, the initialization apparatus of the invention could also be used in connection with a linear medium, such as the magnetic tape, with a reference track being prerecorded thereon.

I claim:

1. Movement controlling apparatus including:
   a moveable medium of a type adapted to carry record tracks,
   a series of data tracks on a data area on said moveable medium and a prewritten reference track on said moveable medium located on one edge of said data area,
   a sensor moveably mounted so as to cross said medium and providing an output signal as a result of the sensor crossing said reference track,
   motor means responsive to signal including pulses applied thereto for moving said sensor across said medium for a distance depending on the number of pulses supplied to said motor means,
   a source of pulses,
   first control means for connecting said source of pulses with said motor means in such a manner that said sensor is moved in a first direction from said data area toward said reference track,
   second control means for connecting said source of pulses with said motor means in another and in such manner so as to move said sensor in a second or opposite direction,
   means for keeping track of the number of pulses applied to said motor means from said pulse source and including a counter for thereby maintaining a count in the counter which is indicative of the position of said sensor on said moveable medium,
   means for so controlling said two control means so that said motor means is effective to move said sensor in said first direction across said reference track and then reverse the motion of said sensor so that it recrosses said reference track moving in said second direction and toward said data area of said moveable medium,
   means connected with said sensor and connected with said counter so as to be responsive to the signal from said sensor as it recrosses said reference track in moving in said second direction toward said data area to thereby reset said counter and thereby initialize said counter so that the counter is effective to indicate the position of tracks in said data area,
   a desired track number register having a content corresponding to any one of said data tracks on said data area,
   a compare circuit having the outputs of said counter and said register applied thereto and having an output according to the difference between the contents of said counter and register, and
   means connecting the output of said compare circuit with said motor means and with said two control means for causing said motor means to drive said sensor in either said first direction or in said second direction to different data tracks in said data area.

2. Movement controlling apparatus as set forth in claim 1, said moveable medium constituting a magnetic disk and said sensor constituting a magnetic head.

3. Movement controlling apparatus as set forth in claim 1, said moveable medium constituting a magnetic disk and said sensor constituting a magnetic head, said reference track being located on said disk adjacent to the outer edge of the disk.

4. Movement controlling apparatus as set forth in claim 3, said motor means including an electric motor of the stepping type and said pulse source including an oscillator for simultaneously driving said motor means and said counter.

5. Movement controlling apparatus as set forth in claim 3, said motor means including an electric motor of the stepping type having a series of electric windings, said two control means including a pulse distributing counter for distributing electrical pulses to the various ones of said motor windings for causing said motor to have a stepping action in either said first direction or in said second direction, said pulse distributing counter having a pair of control terminals for respectively causing the distribution of said pulses in such a manner that the stepping motor drives in said first direction or in said second direction, said two control means for causing said motor means to drive in said first direction or in said second direction including means for applying signals to one or the other of said two control terminals.

* * * * *